3,338,778
THERMOPLASTIC ADHESIVE OF POLYPROPYL-
ENE, CELLULOSE ESTER, POLYVINYL ACE-
TATE, SUCROSE ACETATE ISOBUTYRATE,
AND POLYALKYLENE GLYCOL
James Edwin Hutchins and Henry Cumming Twiggs,
Kingsport, Tenn., assignors to Eastman Kodak Company, Rochester, N.Y., a corporation of New Jersey
No Drawing. Filed Sept. 28, 1966, Ser. No. 583,123
11 Claims. (Cl. 161—226)

This application is a continuation-in-part of Hutchins and Twiggs U.S. Ser. No. 304,556, filed Aug. 26, 1963.

This invention relates to thermoplastic adhesive compositions. In one of its more specific aspects, this invention relates to thermoplastic adhesive compositions that can be applied to a base member in the form of a hot melt. In another one of its more specific aspects, this invention relates to thermoplastic adhesive compositions that can be applied as surface coatings to a base member to provide thereon a non-tacky, non-blocking coating, which coating can be subsequently heat activated to form strong adhesive bonds.

Thermoplastic adhesive compositions that are liquified by heat to produce adhesion are often referred to in the art as hot-melt adhesives. Hot-melt adhesives differ from conventional adhesives in that they are substantially all solid material at normal temperatures, that is, they contain no significant amounts of water or organic solvents and are heated to the fused or molten state prior to application.

One method of employing a hot-melt adhesive composition is to heat the composition until it is fused and has the viscosity required for application. The fused adhesive composition is then applied to a surface of a base member and a second member, to be bonded to the base member, is joined thereto immediately while the adhesive is in the fused state. Cooling to room temperature will cause the fused adhesive composition to solidify and to form a firm bond between the two members. Pressure is usually applied to the members during cooling.

In another method, a hot-melt adhesive composition is applied to a surface of a base member to provide thereon a coating, and the coating is allowed to cool to room temperature. There is thus formed a film or a coating which can be placed into contact later with a surface of a second member to be bonded to the base member, and under the influence of heat and pressure, the coating will liquify or become tacky, wet the other surface, and on cooling, form a firm bond between the two members.

In still another method, a hot-melt adhesive composition can be cast into the form of a thin film on a surface, allowed to cool to room temperature, and subsequently stripped from said surface, thereby there is provided a film of the composition. The film can be sandwiched between two members to be bonded together, after which heat and pressure are applied to the assembly, whereupon the film is liquified and both surfaces of the members to be bonded are wetted. On cooling, a firm bond is formed between the two members.

In any of the above situations, whether an immediate bond is formed, a coating is applied for future sealing, or a film is formed for future laminating and sealing, the speed of setting is usually fast. The time required for setting can be from a few seconds to a fraction of a second. Non-porous and impervious surfaces can be bonded just as fast as porous or pervious surfaces because there is no volatile vehicle present that is to be first removed before a satisfactory bond can form. Therefore, there is a great need in the adhesives industry for improved hot-melt adhesives of the type described above.

An object of this invention is to provide a novel composition adapted particularly for use as a hot-melt adhesive, as a heat-sensitive coating on a base member, and as a heat-sensitive film.

Another object of this invention is to provide a thermoplastic resinous coating that is non-tacky at room temperature.

An additional object of this invention is to provide a thermoplastic resinous film that is non-tacky at room temperature.

A further object of this invention is the production of composite articles comprising two or more members of the same or different material secured together by means of the novel adhesive composition of this invention.

Broadly, in accordance with this invention, resinous polypropylene and certain other resinous compositions are modified by admixing therewith a polyalkylene glycol to provide a composition adapted particularly for use as a hot-melt adhesive.

More specifically, the above objects are attained through the practice of this invention, one embodiment of which comprises providing as a hot-melt adhesive, a new composition of matter consisting essentially of (1) polypropylene and (2) a polyalkylene glycol modifier.

Another embodiment of this invention through which the above objects are attained comprises providing as a hot-melt adhesive, a new composition of matter consisting essentially of (1) a resinous composition consisting essentially of a cellulose ester, polyvinyl acetate, and sucrose acetate isobutyrate and (2) a polyalkylene glycol modifier.

The modifier employed in carrying out this invention is a polyalkylene glycol having an average molecular weight of from at least 600 to about 30,000, and preferable an average molecular weight of from about 1,000 to 20,000. Below a molecular weight of about 600, a composition results which is too thin or watery for the user to properly apply it. Above a molecular weight of about 30,000, the composition is too viscous and will not flow satisfactorily. The amount of polyalkylene glycol employed will be of the order of from about 2% to 55% (preferable from about 10% to 25%) by weight, based on the weight of the resinous polypropylene or the resinous composition. If less than about 2% by weight of the polyalkylene glycol is used, there is no advantageous effect on the bond strengths. No more than about 55% by weight can be used inasmuch as such amounts of a polyalkylene glycol are incompatible with the remaining portion of the hot-melt adhesive.

Polyalkylene glycols that can be used in carrying out this invention include polyethylene glycol that has the structural formula HO(CH$_2$CH$_2$O)$_x$H; polypropylene glycol which has the structural formula $$HO(CH_2CH_2CH_2O)_xH$$

polyisopropylene glycol which has the structural formula

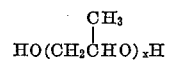

and polytetramethylene glycol which has the structural formula $HO(CH_2CH_2CH_2CH_2O)_xH$. In the above formulas, $x$ is an integer of such a value to provide a compound of desired molecular weight. Mixtures of two or more of the above enumerated polyalkylene glycols can be used in carrying out this invention, if desired.

While it is known in the art that polyethylene glycol is a plasticizer for certain materials (such as polyvinyl acetate) and that low molecular weight polyethylene glycol is an anti-static agent for certain materials (such as polypropylene), the effect of the polyalkylene glycol of this invention is not one of plasticization or reduction of static electricity. The result obtained by employing such a glycol is that the bonds subsequently formed are increased in strength to a great degree. This effect is substantiated by the comparative tests set forth in the examples which follow. Therefore, we are not concerned with plasticization or anti-static properties in this invention, but rather with obtaining increased bond strengths.

According to one aspect of this invention, the resinous composition comprises, by weight, from about 30% to 80% of a cellulose ester, from about 13% to 40% of polyvinyl acetate, and from about 7% to 30% of sucrose acetate isobutyrate. Resinous compositions of this type have been used heretofore as hot-melt adhesive and have been referred to in the art as "cellulosic hot-melts." By modifying these compositions with a polyalkylene glycol, substantially improved bond strengths are obtained.

The cellulose esters usable in this invention are well-known and include cellulose acetate, cellulose butyrate and cellulose propionate. Particularly suitable cellulose esters fo ruse in carrying out this invention include cellulose acetate propionate and cellulose acetate butyrate.

This invention encompasses those cellulose esters, both simple and mixed, of organic acids having 2 to 4 carbon atoms.

The polypropylene which is employed according to another aspect of this invention is a well-known high molecular weight resinous polymer.

The following examples will serve to more fully illustrate the novel features and practices of this invention, especially the highly advantageous results obtained when employing the polyalkylene glycol modifier. However, it will be understood these are but examples of specific embodiments of this invention and, therefore, not in limitation thereof. All parts are by weight unless otherwise indicated.

*Example I*

About 100 parts of a resinous composition comprised of, by weight, 58% cellulose acetate butyrate, 19% polyvinyl acetate and 23% sucrose acetate isobutyrate and about 15 parts of polyethylene glycol having an average molecular weight of about 20,000 are thoroughly admixed and melted together by heating the admixture to a temperature of about 180° C. A substantially homogeneous, compatible composition is produced that can be applied as a hot-melt adhesive at this fusion temperature of 180° C.

The cellulose acetate butyrate employed in the above example is a low-viscosity type and is referred to in the art as half-second butyrate. This cellulose acetate butyrate has a specific gravity of 1.20, an intrinsic viscosity as measured in acetone at 25° C. of from about 0.66–0.86, a molecular weight of about 30,000, a melting point range of from 140° C. to 170° C., an acetyl content of from 12% to 15%, a butyryl content of 35% to 39%, and a hydroxyl content of from 0.5% to 1.2%.

The bond strengths values of the above adhesive composition are determined by shear strength. Two leather strips (1 inch x 3 inches) are bonded flesh (unfinished) side to flesh side. The molten adhesive of Example I is applied by an applicator gun, similar to that employed in the shoe industry, as a cylindrical bead across a surface of one leather strip near one end thereof. The second leather strip is placed by hand over the molten bead to provide a one-half inch overlap joint. The overlap joint is placed between the unheated jaws of a pneumatic sealing machine at a pressure of about 60 p.s.i. for about 5 seconds. A plurality of bonded leather strips are prepared for testing. To obtain bond strength after flexing, a leather-to-leather bond, prepared as above, is bent twice (180 degrees) on opposite sides of the overlap joint across a mandrel having a cross-sectional diameter of one-eighth of an inch. Unflexed and flexed samples are pulled in tension on a Thwing-Albert testing machine at a leading rate of two inches per minute until rupture. The unflexed samples have a bond strength of about 48 p.s.i. By comparison, similar leather strips were bonded together using only fused resinous compositions comprised of, by weight, 58% cellulose acetate butyrate, 19% polyvinyl acetate, and 23% sucrose acetate isobutyrate, and the samples flexed as above and some samples were left unflexed. The unflexed and flexed samples are pulled in tension as above and the unflexed samples have a bond strength of about 10 p.s.i. and the flexed samples have a bond strength of about 3.3 p.s.i.

*Example II*

About 22 parts of polyethylene glycol having an average molecular weight of about 600 is thoroughly admixed with about 100 parts of a resinous composition comprised of, by weight, 58% cellulose acetate propionate, 19% polyvinyl acetate, and 23% sucrose acetate isobutyrate. The mixture is fused by heating to a temperature of about 177° C. The bond strength of the reinous composition alone and the resinous composition modified with the polyethylene glycol are tested in the same manner as that used for testing the adhesive properties of the adhesive of Example I. Test results indicate that the bond strength of unflexed samples of leather strips bonded together using the unmodified resinous composition comprised of, by weight, 58% cellulose acetate propionate, 19% polyvinyl acetate, and 23% sucrose acetate isobutyrate is 3 p.s.i. while the bond strength of the composition of this example is 77 p.s.i. In the testing of flexed samples, leather strips bonded together using unmodified resinous composition indicate that the bond fails on flexing, while the bond strength of the composition of this example, after flexing, is about 79 p.s.i.

*Example III*

About 10 parts of polyethylene glycol having an average molecular weight of about 600 is thoroughly admixed with a resinous composition comprised of, by weight, 58% cellulose acetate propionate, 19% polyvinyl acetate, and 23% sucrose acetate isobutyrate and heated to the fusion temperature of the mixture which is about 177° C. The resulting composition is tested for its adhesive properties in the same manner as that used to test the adhesive properties of the adhesive composition of Example I. Unflexed samples of leather strips bonded together have a bond strength of 60 p.s.i., and the bond strength of flexed samples is 100 p.s.i.

*Example IV*

About 10 parts of polyethylene glycol having an average molecular weight of about 20,000 is thoroughly admixed with a low viscosity polypropylene having an inherent viscosity of about 0.10 to 0.41. The resulting mixture is heated to its fusion temperature which is about 200° C. The same polypropylene, unmodified and in the fused state, is employed to bond together leather strips in a manner similar to that described in Example I, and leather strips are bonded together using the composition of this example. Several samples of each are prepared and some of the samples are flexed in the same manner as that described in the testing of the adhesive composition of Example I. The results indicate that the unflexed samples bonded by unmodified polypropylene have a bond strength of 90.3 p.s.i. and the bond strength of the composition of this example is 104 p.s.i. The flexed samples indicate that the bond strength, after flexing of the unmodified polypropylene is 477 p.s.i. while the bond strength of the composition of this example, after flexing, is 91 p.s.i.

While the above specific working examples are directed to the use of resinous polypropylene and resinous compositions modified with polyethylene glycol of different molecular weights, it is to be understood that this invention is not limited thereto. Thus, for example, polypropylene glycol having an average molecular weight of about 15,000 can be substituted for the polyethylene glycol of Example I with good results, and polytetramethylene glycol having an average molecular weight of about 12,000 can be substituted for the polyethylene glycol of Example III with good results.

In addition, other cellulose esters (e.g., cellulose acetate, cellulose propionate, cellulose butyrate, cellulose acetate propionate, and cellulose acetate butyrate) as defined above can be substituted for the cellulose acetate butyrate of Example I and for the cellulose acetate propionate of Examples II and III with similar results obtained.

The novel hot-melt adhesive compositions of this invention exhibit excellent adhesion to a wide variety of base members. These include, for example, paper, cellophane, glass, ceramic, natural and synthetic resins (in the form of sheets, fibers, fabrics nd the like), wood, metal, leather, and the like. By employing these hot-melt adhesive compositions it is possible to bond glass to glass, leather to leather, leather to glass, leather to paper, paper to paper, paper to wood, wood to wood, metal to metal, leather to wood, leather to metl, paper to metal, and the like.

It will be obvious that the novel and highly advantageous hot-melt adhesive compositions of this invention may contain minor amounts of additives in addition to the resinous polypropylene or resinous composition containing a cellulose ester and the polyalkylene glycol. Examples of such additives would include pigments, dyes, stabilizers, and like materials.

A still further advantage of the present invention resides in the so-called "tack delay" of the resinous coating of this invention. The adhesive compositions of this invention become tacky upon activation with heat, and this tackiness is retained for a reasonable working period after cooling of the resin. The tack delay may vary anywhere from about 10 seconds to about 30 minutes, but the preferred compositions generally exhibit a tack delay of from about 15 seconds to 1 minute at room temperature, which is usually sufficient time to effect a placement of a member to be bonded thereto and proper contact with the tacky coating.

An additional advantage of this invention is the extreme strength of the adhesive bond formed after the adhesive composition of this invention has set from the tacky to the non-tacky state. Of particular advantage is the fact that a flexible composite article prepared by use of the adhesive composition of this invention retains a highly satisfactory and strong adhesive bond after flexing thereof.

As can be seen from the foregoing description, this invention provides an especially advantageous new and useful hot-melt adhesive composition consisting essentially of (1) a resinous component selected from the group consisting of
  (a) polypropylene and
  (b) a resinous composition consisting essentially of, by weight, from about 30% to 80% of a cellulose ester of an organic acid having 2 to 4 carbon atoms, from about 13% to 40% of polyvinyl acetate, and from about 7% to 30% of sucrose acetate isobutyrate, and
(2) from about 2% to 55% by weight, based on the weight of the resinous component, of at least one polyalkylene glycol wherein the alkylene radicals have from 2 to 4 carbon atoms, said polyalkylene glycol having an average molecular weight of from about 600 to 30,000.

Although this invention has been described in considerable detail with reference to certain preferred embodiments thereof, it will be understood that variations and modifications can be effected without departing from the spirit and scope of the invention as described hereinabove and as defined in the appended claims.

We claim:
1. As a new composition of matter, a hot-melt adhesive composition consisting essentially of
  (1) a resinous component selected from the group consisting of
    (a) polypropylene and
    (b) a resinous composition consisting essentially of, by weight, from about 30% to 80% of a cellulose ester of an organic acid having 2 to 4 carbon atoms, from about 13% to 40% of polyvinyl acetate, and from about 7% to 30% of sucrose acetate isobutyrate, and
  (2) from about 2% to 55% by weight, based on the weight of the resinous component, of at least one polyalkylene glycol wherein the alkylene radicals have from 2 to 4 carbon atoms, said polyalkylene glycol having an average molecular weight of from about 600 to 30,000.

2. As a new composition of matter, a hot-melt adhesive composition as defined by claim 1 wherein said polyalkylene glycol is present in an amount between about 10% and 25% by weight, based on the resinous component, and has an average molecular weight of from about 1,000 to 20,000.

3. As a new composition of matter, a hot-melt adhesive composition consisting essentially of
  (1) polypropylene and
  (2) from about 2% to 55% by weight, based on the weight of the polypropylene, of at least one polyalkylene glycol wherein the alkylene radicals have from 2 to 4 carbon atoms, said polyalkylene glycol having an average molecular weight of from about 600 to 30,000.

4. As a new composition of matter, a hot-melt adhesive composition as defined by claim 3 wherein said polyalkylene glycol is present in an amount between about 10% and 25% by weight, based on the polypropylene, and has an average molecular weight of from about 1,000 to 20,000.

5. As a new composition of matter, a hot-melt composition of matter as defined by claim 3 wherein said polyalkylene glycol is polyethylene glycol having an average molecular weight of from about 1,000 to 20,000.

6. As a new composition of matter, a hot-melt adhesive composition consisting essentially of
  (1) a resinous composition consisting essentially of, by weight, from about 30% to 80% of a cellulose ester of an organic acid having 2 to 4 carbon atoms, from about 13% to 40% of polyvinyl acetate, and from about 7% to 30% of sucrose acetate isobutyrate, and
  (2) from about 2% to 55% by weight, based on the weight of the resinous composition, of at least one polyalkylene glycol wherein the alkylene radicals have from 2 to 4 carbon atoms, said polyalkylene glycol having an average molecular weight of from about 600 to 30,000.

7. As a new composition of matter, a hot-melt adhesive composition as defined by claim 6 wherein said polyalkylene glycol is present in an amount between about 10% and 25% by weight, based on the resinous composition, and has an average molecular weight of from about 1,000 to 20,000.

8. As a new composition of matter, a hot-melt adhesive composition as defined by claim 6 wherein said cellulose ester is cellulose acetate butyrate, and said polyalkylene glycol is polyethylene glycol having an average molecular weight of from about 1,000 to 20,000.

9. As a new composition of matter, a hot-melt adhesive composition as defined by claim 6 wherein said cellulose ester is cellulose acetate propionate and said polyalkylene glycol is polyethylene glycol having an average molecular weight of from about 1,000 to 20,000.

10. A composite article comprised of at least two members bonded together with a hot-melt adhesive composition as defined by claim 1.

11. A composite article as defined by claim 10 wherein said members are essentially composed of leather.

No references cited.

WILLIAM H. SHORT, *Primary Examiner.*

J. NORRIS, *Assistant Examiner.*